(12) United States Patent
Turner

(10) Patent No.: US 7,066,805 B2
(45) Date of Patent: Jun. 27, 2006

(54) FINGER PLUCKER LOCK

(76) Inventor: Rodney Allen Turner, 281 E. Pike, Falkville, AL (US) 35622

( * ) Notice: Subject to any disclaimer, the term of this patent is extended or adjusted under 35 U.S.C. 154(b) by 0 days.

(21) Appl. No.: 11/098,217

(22) Filed: Apr. 4, 2005

(65) Prior Publication Data
US 2005/0221745 A1    Oct. 6, 2005

Related U.S. Application Data

(60) Provisional application No. 60/559,174, filed on Apr. 2, 2004.

(51) Int. Cl.
*A22C 21/02*    (2006.01)

(52) U.S. Cl. ........................................................ 452/88

(58) Field of Classification Search ............ 452/87–92; 15/179, 186, 187, 188, 141.1, 141.2, 21.1; 601/46, 114, 139
See application file for complete search history.

(56) References Cited

U.S. PATENT DOCUMENTS

| | | | | |
|---|---|---|---|---|
| 1,082,922 A | * | 12/1913 | Bemis | 15/194 |
| 1,526,579 A | * | 2/1925 | Albertson | 15/198 |
| 2,678,457 A | * | 5/1954 | Demo et al. | 15/29 |
| 3,050,763 A | * | 8/1962 | Martin | 15/197 |
| 3,332,100 A | * | 7/1967 | Mintey | 15/198 |
| 3,343,195 A | * | 9/1967 | Menges | 15/179 |
| 4,595,421 A | * | 6/1986 | Redhead et al. | 134/6 |
| 5,327,615 A | * | 7/1994 | Green | 15/250.4 |
| 5,853,320 A | * | 12/1998 | Wathes et al. | 452/88 |
| 6,026,533 A | * | 2/2000 | Prohoroff | 15/180 |

\* cited by examiner

*Primary Examiner*—Thomas Price
(74) *Attorney, Agent, or Firm*—Dougherty I Clements

(57) ABSTRACT

A resilient rubber finger and a locking mechanism therefore for use in poultry processing plants for the plucking of feathers off if poultry is provided. The rubber-plucking finger is comprised of an oversized base without an annular recess, and a tapered furrowed shank. A plurality of fingers is inserted into a support base through apertures therein. The diameter of the shank proximate the base is substantially equal to the diameter of the support base aperture to ease insertion and removal. A backing plate is provided to abut the rear of the support plate preventing accidental displacement of the rubber finger from the support plate. The support plate is attached to the backing plate using an integrated centrifugal locking mechanism within the backing plate.

6 Claims, 6 Drawing Sheets

FINGER PLUCKER LOCK

CROSS-REFERENCE TO RELATED APPLICATION

This application claims the benefit of the Provisional Patent Application Ser. No. 60/559,174 filed on Apr. 2, 2004.

FIELD OF THE INVENTION

This invention relates generally to equipment used in connection with poultry feather picking machines, and particularly to a method of mounting and securing a resilient picking finger in a poultry feather-plucking device.

BACKGROUND OF THE INVENTION

Machines have been developed for plucking the feathers of poultry for use in poultry processing plants. These picking machines typically have drums and/or discs to which resilient rubber or synthetic picker fingers are mounted. The drums or discs are positioned along each side of a path of travel along which birds are conveyed. The drums or discs are then rotated at speeds as high as 600 to 1250 rpm causing the resilient fingers to be constantly driven into contact with the birds. Frictional forces between the rubber fingers and the feathers remove the feathers from the bird. However, the fingers tend to wear quickly, with an average processing line requiring replacement of from 8,000 to 10,000 fingers per month. With many processing plants running 3 or more processing lines, it is not atypical for a plant to replace one half million fingers per year.

The picker fingers typically have an enlarged disc-shaped base formed with an annular recess from which base a tapered, furrowed shank extends. Each finger is installed in a disc with the annular recess of the finger base located within a hole in the support disc or drum (hereinafter referred to as "disc") with the recess edges abutting and therefore gripping opposite sides of the rim about the hole of the support disc. The finger shank adjacent the annular recess is oversized, i.e., larger than the hole in the support disc, in order to prevent the finger from becoming dislodged when the discs are brought up to operating rotational speeds. However, this oversized arrangement results in substantial difficulty when removing and replacing fingers. Worn fingers are removed from the disc by cutting the finger at its annular recess. The two pieces can then be removed with relatively little effort. A new finger is installed by passing its shank portion from behind the disc through the enlarged hole in the disc until its tapered surface adjacent its enlarged base engages the rim about the hole. The shank is then pulled with a substantial degree of force in order to seat the annular recess about the edge of the hole.

It is inherently difficult to seat the picking fingers within the disc holes manually due to the amount of force required in pulling their base portions into the support holes. Due to the orientation of the discs within the processing machinery, it is often difficult to reach the fingers that need to be replaced. Not only is a substantial amount of strength required but also the space available in which to work is usually quite restricted making it awkward to exert the force needed to properly seat the annular recess about the hole edge. Carpal tunnel syndrome, tendonitis, and other stress related injuries are common among operators who routinely change fingers.

DESCRIPTION OF THE PRIOR ART

U.S. Pat. No. 5,711,703 issued to Peretz discloses an apparatus for removing a rubber finger from a disc or rotational drum. The finger shank is inserted into the apparatus where a blade cuts the finger close to the annular recess. The base of the finger can then be simply pushed through the backside of the disc. This invention does not address the inherent difficulties of inserting new fingers into the disc, but rather is concerned only with the removal of worn fingers.

U.S. Pat. No. 5,106,333 issued to Van Dorn et al. discloses a poultry picking apparatus comprising four independently moveable banks of rotating discs. The picker banks can be adjusted to provide a smaller or larger path of travel for processing poultry, in order to optimize feather removal from the carcass. By tilting the banks outward, one can assume that an operator would be granted slightly increased access to the interior of the machine to change the fingers. However, such additional space seems minimal, with the invention being directed to optimization of feather removal, not ease of finger replacement.

U.S. Pat. No. 4,514,879 issued to Hazenbroek discloses an apparatus wherein the banks of pickers are rotatably mounted around a horizontal axis. The picker banks can be rotated around the axis away from the opposite bank of pickers so that the picking fingers and other elements of the apparatus can be cleaned, repaired, and/or replaced without obstruction from the opposite bank of pickers. While this does alleviate much of the ergonomic difficulty of replacing the fingers, the same amount of pulling force is still required to properly seat the finger's annular recess about the hole edge. Additionally, this would require the operator to make a large initial capital expenditure to install the rotating banks.

U.S. Pat. No. 4,512,072 issued to Graham discloses an apparatus for seating the resilient fingers within the rotating discs or drums. A housing on the apparatus is situated abutting the support disc so that the finger is inserted into the interior of the apparatus. Upon actuation of a pressurized fluid drive, the apparatus grips the finger and pulls it into the housing interior until the finger is properly seated in the disc hole. While useful in inserting the fingers, this device does nothing to simplify removal. Furthermore, ergonomic and space issues are compounded when an operator is trying to maneuver this apparatus into the confined space allowed by most plucking apparatuses.

U.S. Pat. No. 4,329,760 issued to van Mil discloses a plucking machine wherein the circumferential path of travel of the fingers of one disc overlap with the path of travel of adjacent discs. In this manner, fowl limbs are prevented from becoming lodged in the spaces between rotating discs. There is no disclosure relating to the seating or removal of the picking fingers themselves.

U.S. Pat. No. 4,292,709 issued to van Mil discloses a picking element wherein the traditional disc or drum has been replaced with a rotating "beaker-shaped" picking element. Problems inherent to the prior art of inserting and removing the rubber fingers are still present.

U.S. Pat. No. 3,943,599 issued to Norwood discloses an apparatus for seating rubber plucking fingers, wherein a the finger is initially threaded through the hole, and then inserted into the apparatus between a pair of counter-rotating drive rollers. The drive rollers grip the finger, and pull it into the support hole, seating the annular recess about the hole edge. While useful in inserting the fingers, this device does nothing to simplify removal. Furthermore, ergonomic and space issues are compounded when an operator is trying to maneuver this apparatus into the confined space allowed by most plucking apparatuses.

SUMMARY OF THE INVENTION

Briefly described, the present invention is a novel support disc and rubber finger structure that allows an operator to easily insert and remove plucking fingers from the support disc without the application of excessive force. Furthermore, the operator is not required to contort himself into strange and uncomfortable positions in order to access the picking fingers. Replacement is accomplished easily and comfortably.

The novel rubber plucking fingers of the present invention do not have the annular recess and oversized shank that was present in the fingers of the prior art. The fingers can easily be slid through the corresponding holes in the support plate, without the requirement that excess force be used in order to properly seat the annular recess about the hole edge. The rubber finger is therefore only comprised of an oversized base to prevent the finger from being pulled entirely through the support plate hole, and a tapered furrowed shank. The diameter of the shank proximate the base is substantially equal to the diameter of the hole to ease insertion and removal. The diameter of the shank is therefore such that the picking finger can easily rest securely in the support hole, but backward movement of the finger can be easily accomplished with only minimal force being applied. The annular recess should not be confused with the gripping rings or protrusions, which are located remote from the oversized base, as such are provided to increase frictional forces between the finger and the feathers, and have nothing to do with the retention of the finger within the support base.

In order to prevent unwanted movement of the finger within the hole, and possible dislodgement therefrom, a backing plate is provided to abut the rear of the support plate and hold the finger securely. The backing plate is attached to the rotatable shaft so that the backing plate abuts the oversized base of the rubber fingers, preventing accidental displacement of the rubber finger from the support plate. The support plate is attached to the backing plate using an integrated locking mechanism.

To ensure that the backing plate and the support plate rotate as a unitary piece, the integrated locking mechanism is preferably a centrifugal locking mechanism. When the discs are rotated at full operating speeds, usually between 600 and 1250 rpm, conventional insertion locks such as a clamp-locking device tend to slip, thereby reducing the operating efficiency of the rotating fingers. By employing a centrifugal locking mechanism, the support plate and the backing plate are held together tightly when the disc assembly is rotating at its maximum velocity.

OBJECTS OF THE INVENTION

It the principled object of the current invention to provide an improved resilient rubber finger for the plucking of feathers from poultry.

It is another object of the current invention to provide an improved resilient rubber finger that can be easily inserted into and removed from apertures in a support disc.

It is another object of the current invention to provide an improved resilient rubber finger that can be retained within the support disc without the inclusion of an annular recess in the finger's shank.

It is another object of the current invention to provide a new support disc assembly for use with resilient rubber finger in the plucking of feathers from poultry.

It is another object of the current invention to provide a new support disc assembly for use with resilient rubber finger in the plucking of feathers from poultry wherein the new support disc assembly includes a backing plate to prevent the rubber fingers from becoming dislocated through the rear of the support disc.

It is another object of the current invention to provide a new support disc assembly for use with resilient rubber finger in the plucking of feathers from poultry wherein the support disc is locked to the backing disc utilizing a centrifugal locking mechanism.

BRIEF DESCRIPTION OF THE DRAWINGS

The above-mentioned and other features and objects of the invention will become more readily apparent and the invention itself will be better understood by reference to the following detailed description taken in conjunction with the accompanying drawings, wherein.

DETAILED DESCRIPTION

Figure 1:
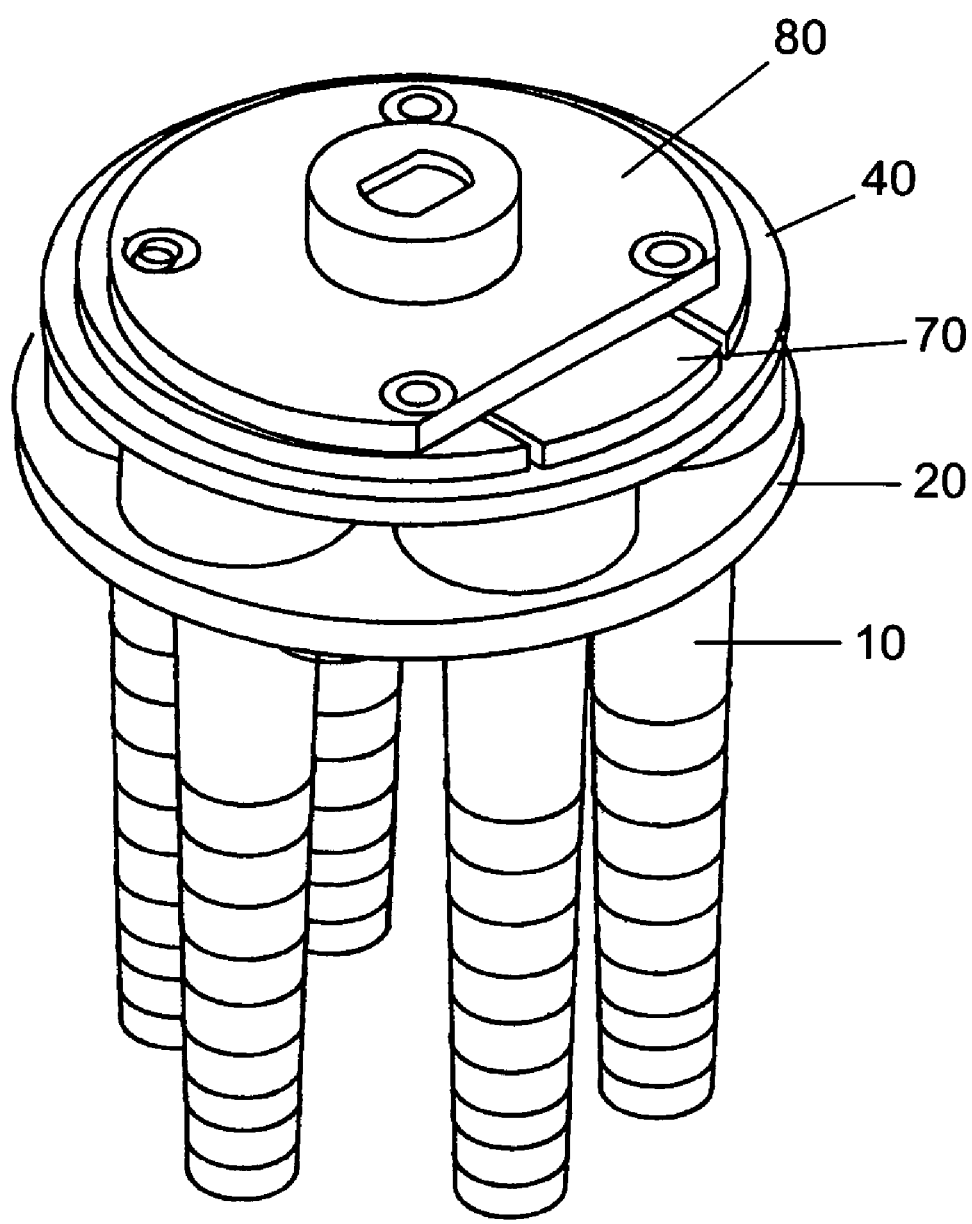
FIG. 1 is a perspective view of the assembled fingers, finger plate, and centrifugal locking mechanism of the current invention.
Figure 2:
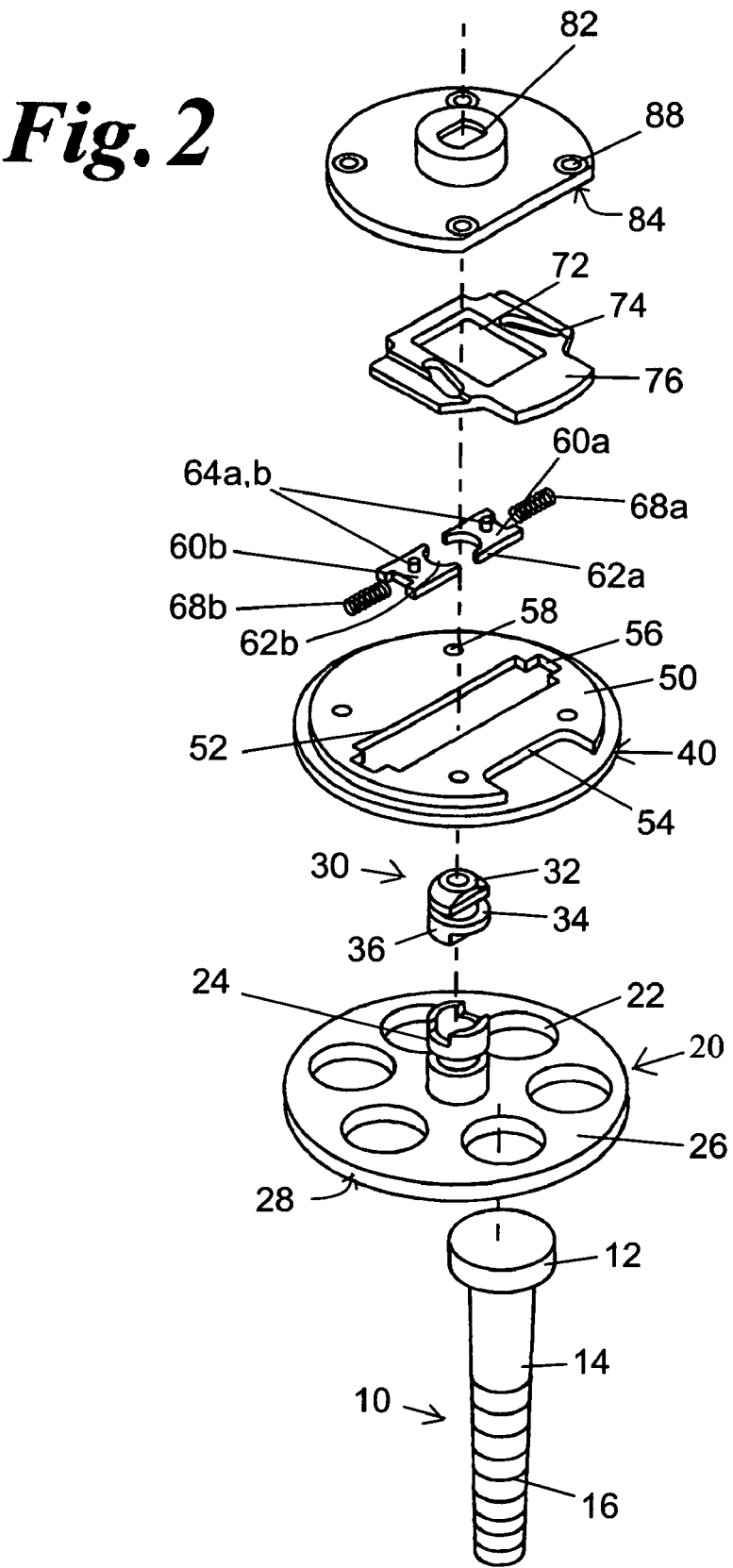
FIG. 2 is an exploded perspective view of the fingers, finger plate, and centrifugal locking mechanism of FIG. 1.
Figure 4:
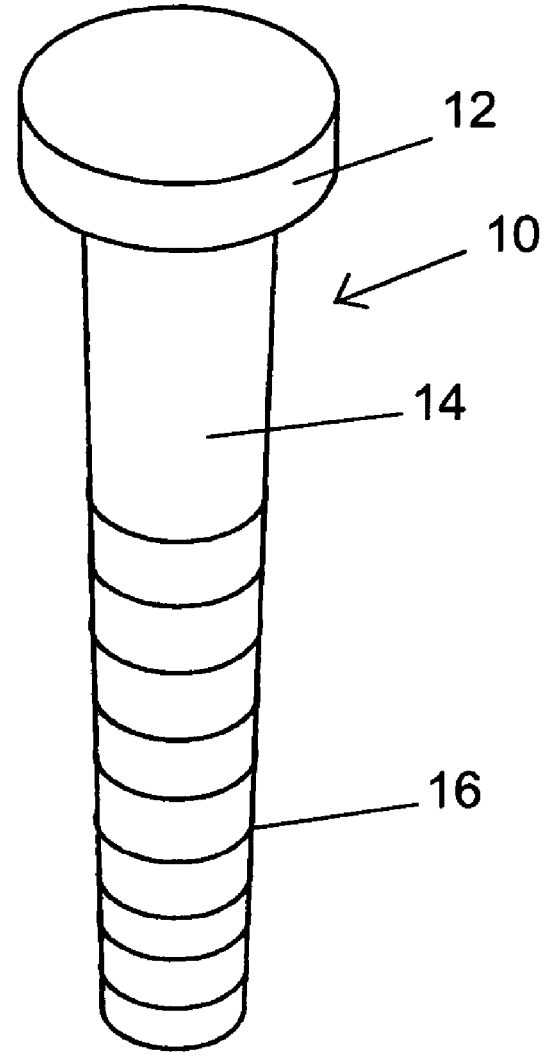
FIG. 4 is a perspective view of the invented rubber finger according to the invention.

Referring now to the drawings, and particularly to FIGS. 1, 2, and 4, fingers 10 are generally made of a natural rubber, or a synthetic material, that provides adequate friction to effectively remove feathers from the poultry carcass, but also pliable enough so that the carcass is not damaged from repeated impacts by the spinning fingers. Suitable materials include, but are not limited to natural rubbers, synthetic rubbers including, but not limited to, Styrene-butadiene rubber, Isoprene rubber, Butadiene rubber, Ethylene-propylene rubber, Butyl rubber, Chloroprene rubber, Nitrile rubber, and combinations thereof. It is further contemplated that the natural and synthetic rubber compositions can include various additives, such as tackifiers, pigments, anti-oxidants, anti-UV, etc., and all of such are contemplated, and do not effect the scope of the present invention.

Figure 3:
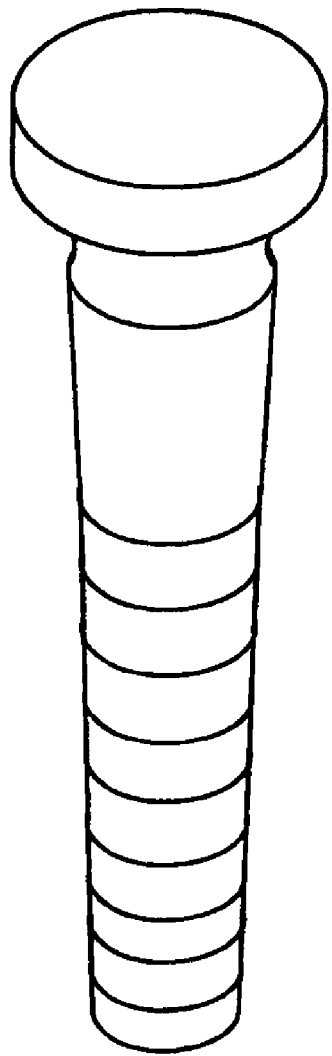
FIG. 3 is a perspective view of a resilient rubber finger according to the prior art.

The fingers themselves comprise an enlarged base 12, and a tapered shank 14. The base 12 prevents the shank from dislodging from the finger plate 20 at operational speeds. The shank 14 is that operational part of the finger that actually comes into contact with the poultry carcass, and removes the feathers there from. Optionally, the fingers can have a grip pattern 16, which can be a series of furrows within the shank, or a pattern of extensions from the shank. The grip pattern 16 provides increased friction between the finger and the feathered carcass, which thus improves the removal of feathers when the machinery is in operation. The invented fingers lack the annular grove adjacent the base that is generally present in the fingers of the prior art (See FIG. 3).

Finger 10 is threaded through one of a plurality of finger holes 22 on finger plate 20, such that the base 12 sits snugly adjacent the first side 26 of the finger plate 20, and the shank extends from the second side 27. Ideally, the finger 10 will have a diameter that is nearly equal to, or slightly larger than diameter of the finger hole 22. This prevents any excessive rotation of the finger within the finger hole, which would decrease the efficiency of feather removal.

Located at the rotational center of the finger plate 20 and extending from the first side 26 is a locking bolt 30 (See FIG. 2). The bolt has a shaft 32, an annular recess 34, and a head 36. The locking bolt is inserted into the centrifugal locking mechanism, as described infra, such that the finger plate is held securely without slippage at operational velocities.

The shaft 32 extends though a center aperture 46 on base plate 40. The base plate 40 has a diameter approximately equal to that of the finger plate 20. When a plurality of fingers 10 are inserted into the finger plate, the base plate 40 sits snuggly against the fingers' bases 12, to hold the fingers 10 in place when the assembly is spinning at operational speeds. Intimate contact between the finger bases 12, and the base plate 40 is necessary to ensure that the fingers do not dislodge from the finger holes.

Figure 5:
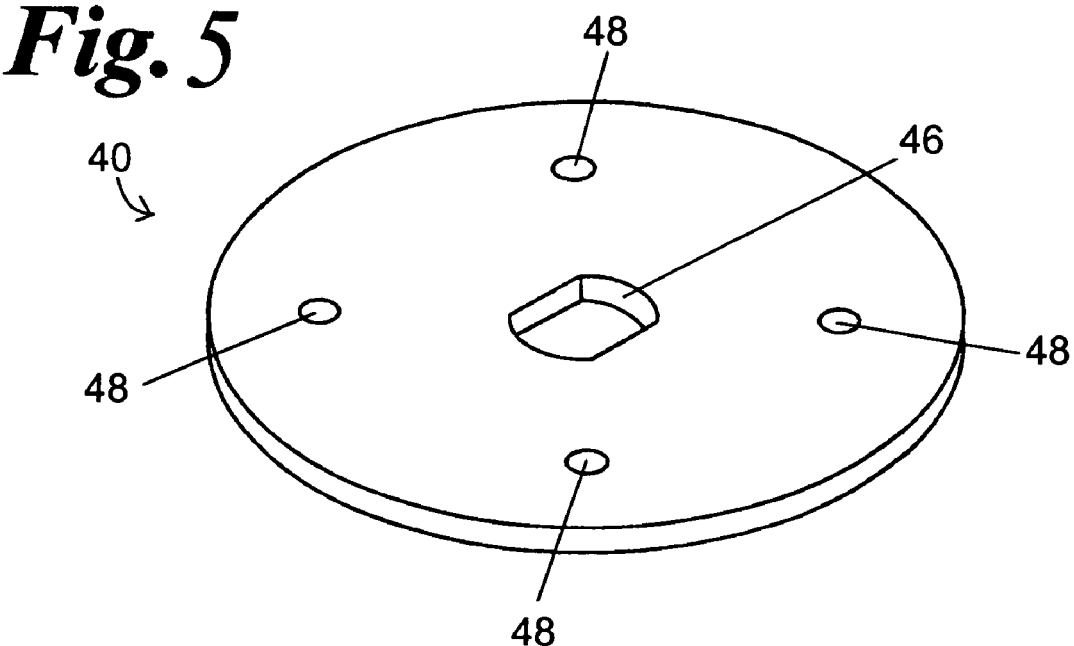
FIG. 5 is a perspective view of the invented base plate according to the invention.
Figure 6:
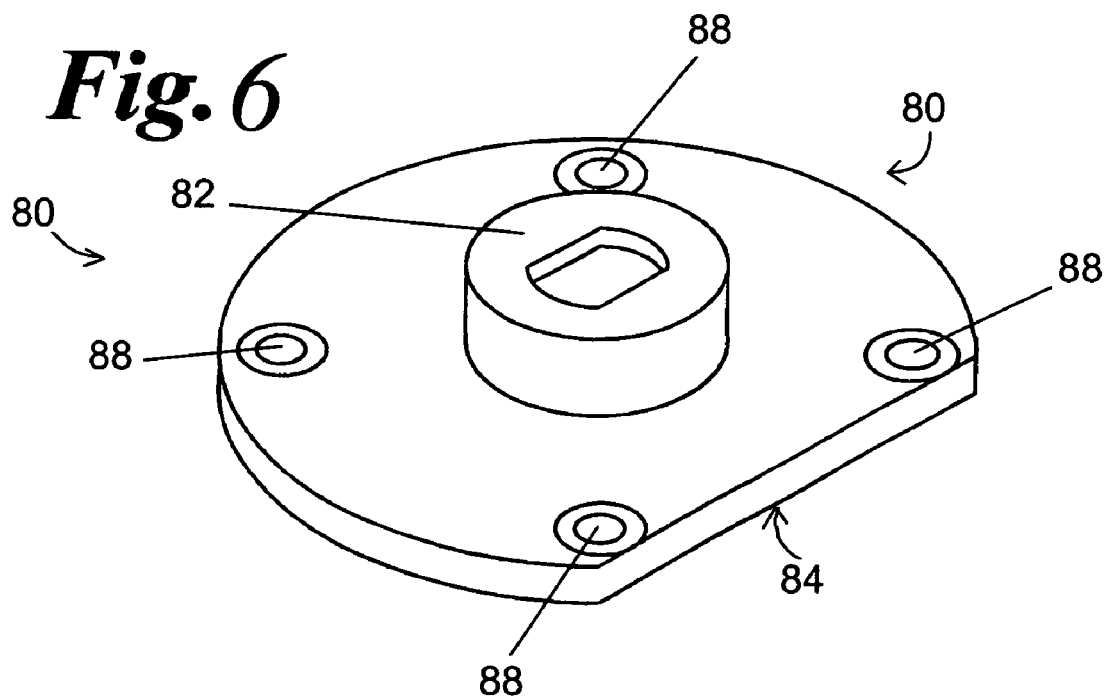
FIG. 6 is a perspective view of the invented top plate according to the invention.
Figure 7:
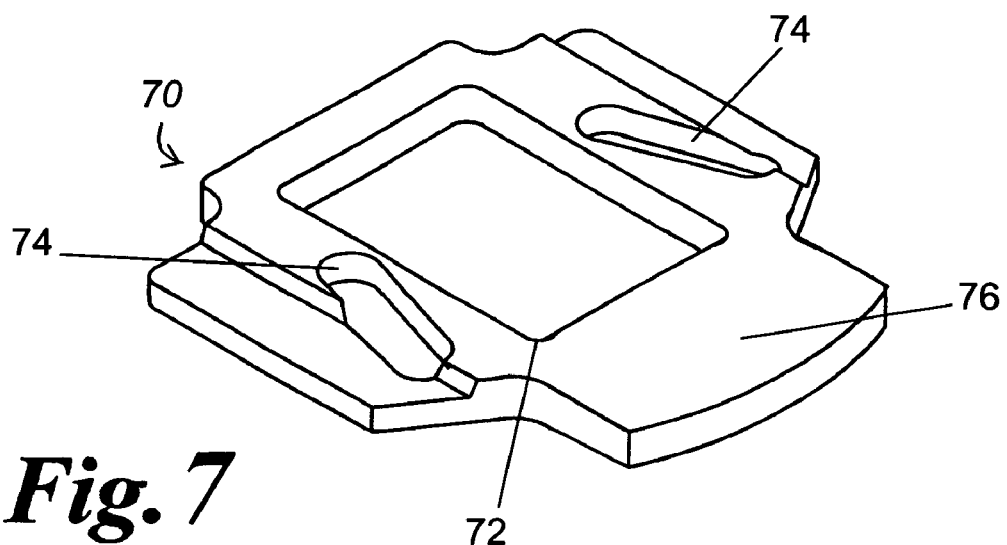
FIG. 7 is a perspective view of the invented slide lock according to the invention.
Figure 8:
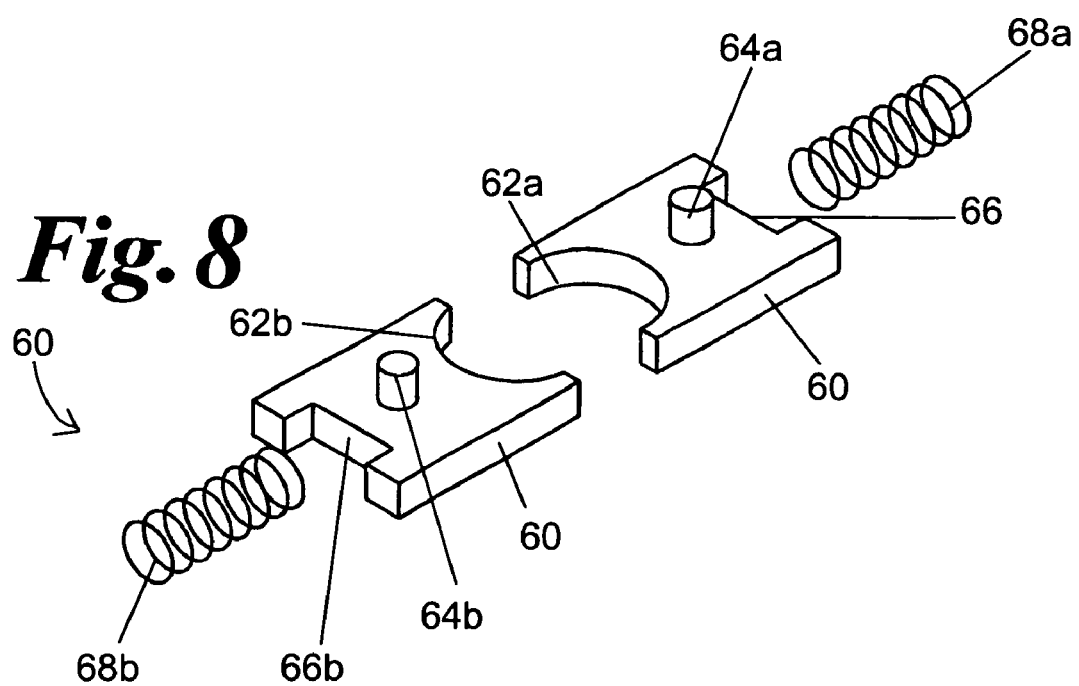
FIG. 8 is a perspective view of the invented slide clamps according to the invention.

The base plate 40 has a plurality of screw holes 48 proximate the outer edge of the base plate (See FIG. 5). Preferably, the screw holes 48 are positioned around the base plate 40 so that any torque created by one hole would be cancelled by the other holes.

Atop the base plate 40 sits the lock plate 50. The lock plate is also provided with a plurality of screw holes 58 that align with the screw holes 48 on the base plate.

A clamp recess 52 is located within and along a diameter of the base plate 50, so that it overlaps, and sits atop the base plate center aperture 46. The clamp recess is an elongated rectangular cutout in the lock plate. A pair of spring indents 56 are located at ends of the clamp recess, proximate to the base plate's outer edge.

A pair of opposing slide clamps 60*a,b* are positioned within the clamp recess. Each slide clamp 60 is provided with a pin 62*a,b*. A pair of springs 68*a,b* engage with the spring indents 56*a,b* and also with spring indents 66*a,b* to hold the slide clamps together within the lock plate 50. Opposed arcuate clamps 62*a,b* form an aperture having about the same diameter as annular recess 34 of the locking bolt 30. Upon insertion of the locking bolt, the arcuate clamps 62*a,b* engage the locking bolt 30 about the shaft 36 within the annular recess 34. Springs 68*a,b* ensure that the arcuate clamps maintain intimate contact with the shaft 36 within the annular recess 34, while the head 32 and shaft 36 prevent unwanted disengagement of the arcuate clamps 62*a,b* from the shaft 36 within the annular recess 34.

Figure 10:
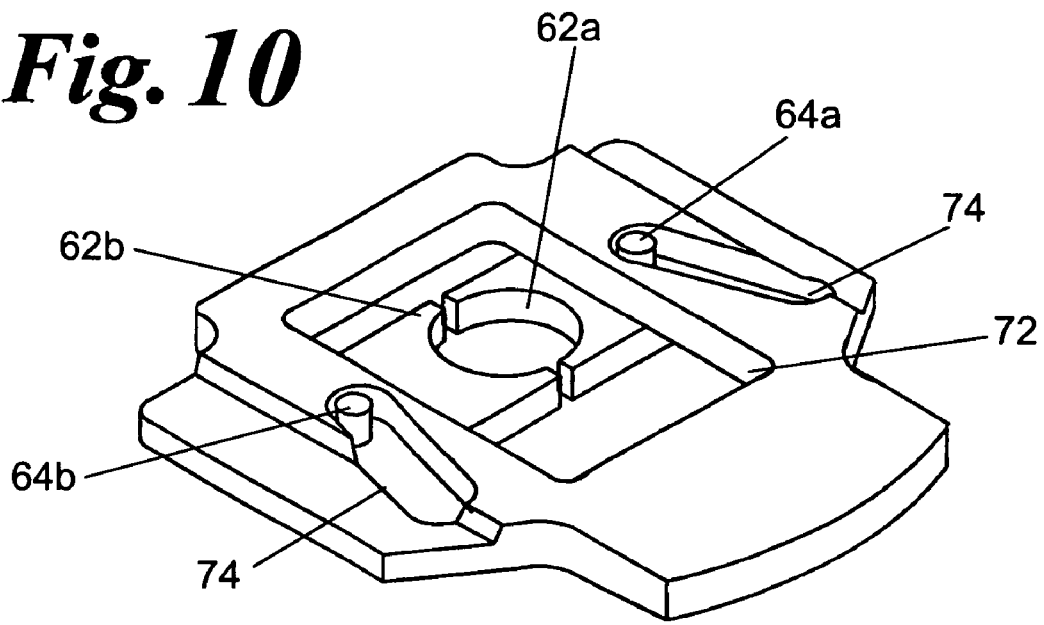
FIG. 10 is a perspective view of the slide lock of FIG. 7, shown in conjunction with the slide clamps of FIG. 8, in a bolt retaining configuration.

Sitting atop the lock plate is the slide lock 70. A pair of angled pin slides 72*a,b* is provided. The pin slides 72*a,b* mate with the pins 62*a,b*. The slide lock is capable of movement normal to that of the slide clamps 60*a,b*. Thus, movement of the slide lock in direction a first direction will produce a tightening effect of the clamps 60*a,b* about the shaft 36 (See FIG. 10), while movement of the slide lock in the opposite direction will cause the clamps 60*a,b* to release from the shaft 36 within the annular recess 34 (See FIG. 9), so that the shaft 36 and the finger plate 20 can be removed from the assembly. The slide lock is provided with a cavity 72, so that movement of the slide lock will not interfere with operation of the shaft 36 and clamp 60*a,b*.

Extending from one side of the slide lock is a torque arm 76. The torque arm 76 extends above the recess 54 of the lock plate 50. The torque arm 76 acts as a "release button," in that depression of the torque arm will cause movement of the slide lock effecting a loosening of the arcuate clamps 62*a,b* from the annular recess 34 (See FIG. 9), and providing an easy release of the shaft 36 and the finger plate 20 from the rest of the assembly.

The torque arm also is key to proper functioning of the centrifugal lock. The torque arm is purposely out of balance about its central cavity. When the assembly spins about its axis, the torque arm is accelerated away from the axis, creating a force in the A direction. This force causes pins 62*a,b* to tighten around the annular recess 34, such that slippage of the shaft between the slide locks is minimized.

A top plate 80 sits atop the slide lock 70. The top plate's underside has been hollowed out, so that the slide lock will fit within the hollow, and easily move therein. When properly situated, the top plate's edges will be in contact with the lock plate, and only the torque arm will be visible as extending out from the top plate.

Provided in the top plate is a plurality of screw holes 88 that align with screw holes 48 and 58. A screw or retaining bolt, not shown, can then be threaded though each of holes 48, 58, and 88 to hold the entire locking mechanism together.

In use, fingers 10 are inserted into a detached finger plate 20. The locking bolt 30 of the finger plate 20 is then inserted through the center aperture 46 of the base plate 40. As the locking bolt 30 presses into the slide clamps 60*a,b*, the tapered head 32 causes the slide clamps 60*a,b* to spread slightly, allowing for penetration of the tapered head 32. Slide clamps 60*a,b* then close around the annular recess 34, preventing the inadvertent removal or dislodging of the finger plate 20.

When the assembly begins to rotate, the unbalanced weight of the torque arm 76 provides an outward force normal to the rotational axis of the apparatus. Pins 64*a,b* slide in the pin slides 74*a,b*, so that outward forces to the torque arm 76 create a corresponding tightening of the arcuate clamps 62*a,b* about the shaft 36 within the annular recess 34. This tightening prevents slippage of the shaft 36 within the assembly, which would decrease feather removal efficiency. Slide clamps are shown in the bolt retaining configuration in FIG. 10. Furthermore, the tightening prevents the inadvertent disengagement of the locking bolt 30 from the remainder of the device.

Figure 9:
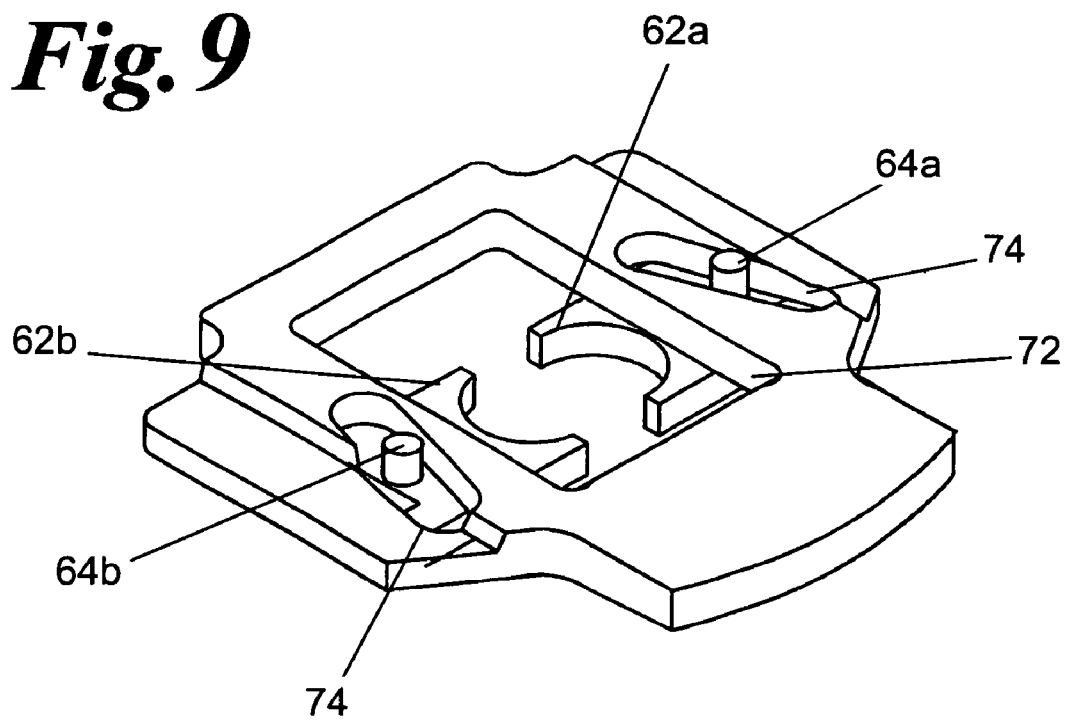
FIG. 9 is a perspective view of the slide lock of FIG. 7, shown in conjunction with the slide clamps of FIG. 8, in a bolt releasing configuration.

When fingers 10 need to be replaced, the torque arm 76 is depressed towards the rotational axis (as shown in FIG. 9), which forces the slide clamps 60*a,b* outward from the shaft 36. The finger plate 20 can then be easily removed from the rest of the assembly. Worn or broken fingers simply slide out of the finger holes 22, and replaced with new fingers. The finger plate 20 is then replaced into the center aperture 46 as described above, and operation of the assembly can continue. Thus, finger replacement can be accomplished without the awkwardness and difficulty of the prior art devices.

SUMMARY OF THE ACHIEVEMENT OF THE OBJECTS OF THE INVENTION

From the foregoing, it is readily apparent that I have invented a novel resilient rubber finger and disc assembly for use in connection with poultry feather picking machines, and also to a method of mounting and securing a resilient picking finger in a poultry feather-plucking device. It is further apparent that the resilient rubber finger can be easily inserted into and removed from apertures in a support disc. Furthermore, it is evident that the disc assembly is easily removable, so that an operator undergoes little or no strain in replacing and servicing the fingers. Finally, it is evident that the disc assembly is easily attachable to a rotatable shank utilizing an integrated novel centrifugal locking mechanism.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

I claim:

1. An apparatus for the processing of poultry carcasses, said apparatus comprising:
    a finger plate comprising at least one finger hole, a first side, a second side, and at least one locking bolt,
    at least one finger, comprising an oversized finger base and a finger shank, wherein said finger is threaded through said at least one finger hole, such that said base substantially abuts said first side of said finger plate, with said shank extending from said second side, and
    a base plate, having a front side, a rear side, and at least one aperture,
    at least one centrifugal locking mechanism affixed to said base plate,
    wherein at least one locking bolt can be inserted into said at least one aperture, thereby retaining said locking bolt within said at least one centrifugal locking mechanism, and compressively retaining said finger base between said base plate and said finger plate, and
    wherein said centrifugal locking mechanism tightens around said at least one locking bolt when said apparatus is operationally rotated about an axis defined by said at least one locking bolt.

2. The apparatus of claim 1, wherein said centrifugal locking mechanism comprises:
    a lock plate having a clamp recess
    at least one slide clamp, slidably secured within said clamp recess
    a slide plate, having a torque arm, situated atop the lock plate, and slidably secured to said at least one slide clamp,
wherein rotation of said centrifugal locking mechanism exerts a force on said torque arm normal to the rotational axis, said force causing a sliding movement of said slide plate, and a corresponding movement of said slide clamps.

3. The apparatus of claim 2, wherein said at least one locking bolt is retained within said locking mechanism by said slide clamps.

4. The apparatus of claim 3, wherein rotation of said centrifugal locking mechanism causes said at least one slide clamp to tighten around said locking bolt.

5. The apparatus of claim 3, wherein said centrifugal locking mechanism further comprises at least one spring for the retention of said locking bolt when the centrifugal locking mechanism is not rotating.

6. The apparatus of claim 2, wherein said torque arm also functions as a release button for removing said finger plate from said centrifugal locking mechanism.

* * * * *